Dec. 12, 1961

J. GROSS 3,012,716

POSITION INDICATOR

Filed April 5, 1957

2 Sheets-Sheet 1

Fig.1.

Dec. 12, 1961  J. GROSS  3,012,716
POSITION INDICATOR
Filed April 5, 1957  2 Sheets-Sheet 2

INVENTOR
JEROME GROSS
BY Borst & Borst
ATTORNEYS

United States Patent Office 3,012,716
Patented Dec. 12, 1961

3,012,716
POSITION INDICATOR
Jerome Gross, Bayside, N.Y., assignor to Sperry Rand Corporation, Ford Instrument Company Division, Long Island City, N.Y., a corporation of Delaware
Filed Apr. 5, 1957, Ser. No. 651,010
5 Claims. (Cl. 235—61.5)

This invention relates to a position indicator for determining the arrival of a vehicle over the longitude of a desired destination.

In general the device is adapted to employ velocity predicting mechanism, which continuously yields an indication of present location, together with a longitude of destination indicator, so as to establish arrival over the desired longitude when the two indications are coincident. The velocity indicator determines rate of change in position in terms of the continuous changes in times of sunrise and sunset for the travelled positions and the invention provides solar light responsive means for making velocity corrections in the velocity predicting mechanism and for making change of latitude corrections in the destination indicator so that sunrise-sunset times over the longitude of destination can be predicted for the particular latitude at which it develops the desired longitude will be crossed.

It is therefore an object of the invention to provide a system for indicating the presence of a vehicle at an assumed longitude.

A further object of the invention is to provide an improved position indicator whose velocity predictions are periodically tested so as to effect adjustments thereof during operation by mechanism which is actuated by solar light.

Figure 2:
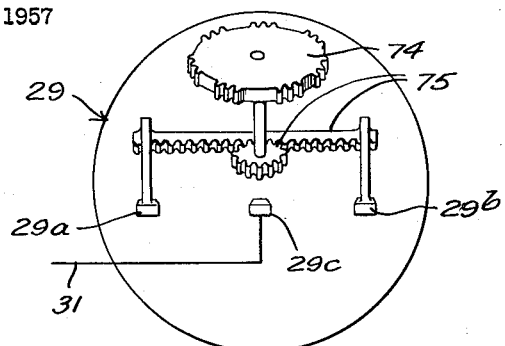
Figure 3:
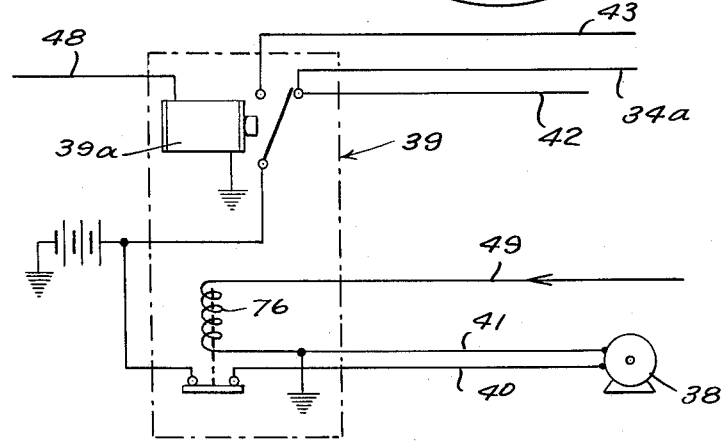
Figure 4:
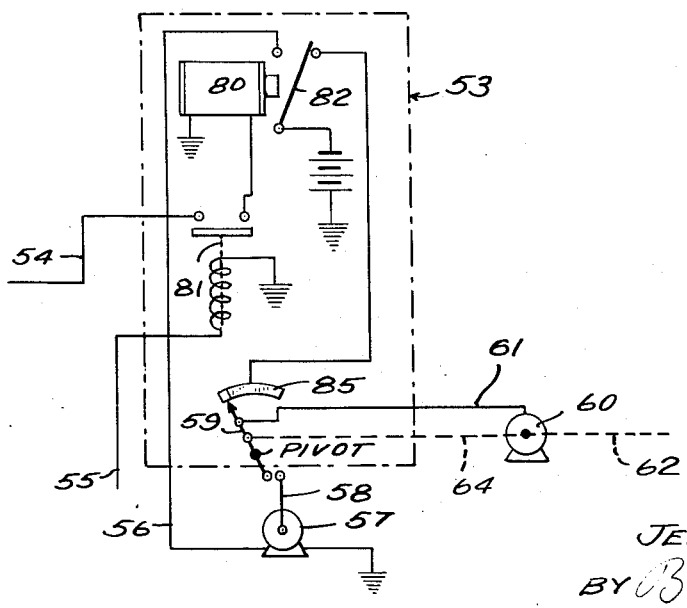

The features and other objects of the invention will be understood more clearly from the following detailed description taken in conjunction with the accompanying drawings, in which FIG. 1 schematically illustrates one embodiment of the position indicator, FIG. 2 discloses the elements contained in voltage device 29, FIG. 3 schematically discloses the elements of relay circuit 39, and FIG. 4 schematically discloses the elements of relay circuit 53.

A basic component of the position indicator is clock 1 having a clock hand 2 which is driven by a spring-wound clock motor 3. Concentric with the shaft of the clock are two additional hands 4 and 5 which indicate continuously times of sunrise and sunset, respectively, at the present location of the indicator. Contacts 6 and 7 are provided in circumferential slots in the clock face and are located therein in accordance with the predicted times of sunrise and sunset at the intended longitude of destination of the vehicle on which the indicator is carried.

The hands 4 and 5 are activated by an adjustable speed device such as integrator 8 the disc of which is driven by a constant speed motor 9. The output roller of the integrator 8 drives the hand 4 through connected shaft 10, differential 12, shaft 14, differential 15 and shaft 33 and drives the hand 5 through the shaft 10, the differential 12, the shaft 14, connected shaft 16, differential 17 and shaft 18. Shaft 19, which is settable in accordance with the Greenwich mean time of sunrise and sunset, is connected into the differential 12 and serves initially to set the hands 4 and 5 at the launching site. Hand crank 35 is connected to the shaft 19 for the purpose of this control setting. After launching, the driving speed for the hands 4 and 5 ideally should accord with the velocity of the vehicle in terms of changes in longitude and latitude and is dependent on the location of the integrator carriage whose position is established by means of D.C. motor 20 and shaft 21 which connects the motor armature to the integrator carriage. The means for preselecting the carriage position in accordance with the predicted velocity in longitude units of the vehicle and then adjusting the carriage position according to corrections for that velocity is described as follows.

A differential 22 is connected at its input side to the shaft 19 by means of shaft 23. Differential output shaft 24 of the differential 22 is in driving connection with shafts 25 and 26 and drive voltage devices 29 and 30 through clutches 27 and 28, respectively, which constitute a memory circuit. The voltage devices 29 and 30 may have a Geneva or multilated pinion type of intermittent drive mechanism units having positive and negative reference voltage sources (not shown) with electrical outputs on leads 31 and 32, respectively, which are selectively set into the motor 20 by means of solenoid switch 34. As shown in FIG. 2, the voltage device 29 includes an intermittent gear 74 which controls by means of rack and pinion 75 the positioning of positively energized contact 29a and negatively energized contact 29b in relation to stationary contact 29c to which the lead 31 is connected. The elements of voltage device 30 are similarly arranged. Thus, it may be seen that the output of the motor 20 on shaft 21 is controlled by the shaft 23 the turning of which by means of hand crank 35 which is mechanically connected thereto adjusts the carriage position of the integrator for predicted velocity. Feedback shaft 36 connecting the shaft 21 to the differential 22 assures a true correspondence between input and output, this correspondence occurring when the differential 22, actuated by the feedback on the shaft 36, has turned back the intermittent drive mechanism in the voltage device 29 or 30 until the motor 20 has been disconnected from the source voltage in the operating voltage device.

After launching the carriage of the integrator 8 is positionally controlled by the motor 38 whose armature shaft is also connected to the shaft 23. The motor 38 is run from a relay circuit 39 through leads 40 and 41. The relay circuit 39 also controls the clutches 27 and 28 by means of leads 42 and 43 and the solenoid switch 34 to which it is connected by lead 34a. The relay circuit 39 is energized by photocell 44 and potentiometer 45 whose output is adjusted by altimeter 46 with shaft 47 connecting the two devices. Lead 48 connects the potentiometer 45 to the relay circuit 39. The relay circuit 39 is connected to the clock hand 2 by a feedback connection 49 which is energized on contact with hand 4 or hand 5 to prevent any changes in the relay circuit output after contact assuming the photocell 44 is in a state required of it by the light conditions normally prevailing at sunrise or sunset. For this purpose a 6-volt potential is impressed on the hands 4 and 5.

The relay 39 is shown in some detail in FIG. 3. As illustrated, the relay includes an electromagnet 39a which is energizable by the lead 48 from the potentiometer 45. The relay 39 includes solenoid switch 76 controlled by the feedback line 49 and connecting the servo motor lead 40 to a battery in the relay circuit. When the electromagnet 39a is magnetized the battery is also connected to the line 43 which controls the clutch 28 for the voltage device 30 in which is stored the estimated velocity for night time travel. The battery in the relay circuit is connected to the lead 42 when the electromagnet 39a is deenergized which is a condition of the electromagnet from sunset to sunrise. The lead 34a for the solenoid switch 34 is also connected to the battery when the electromagnet is in this state.

The hands 4 and 5 and the contacts 6 and 7 must be adjusted for latitude since times of sunrise and sunset are functions of latitude as well as longitude. Because latitude is proportional to twilight periods, which range from about 10 minutes near the equator to one hour or more in the region near 65° latitude, twilight is used as a reference in determining the correction factor for latitude.

Accordingly, there is provided a photocell 50 whose output on potentiometer 52 has a triggering threshold which is controlled by the altimeter 46 through the shaft 47. Relay circuit 53 is connected on its input side to both photocells by leads 54 and 55. The photocell 50 is set with a threshold level such that it senses the darker end of the twilight period and actuates the relay circuit 53. Lead 56 connects the relay circuit 53 to a constant speed motor 57. The beginning of the twilight period causes the time interval arm 58 to start swinging, and at the end of the twilight period to stop swinging. Motor 60 is energized by output lead 61 of the relay circuit 53 when the constant speed motor is stopped and feeds the twilight time interval measured by the motor 57 on shaft 62 to an adjustable cam 63, the output of which is sunrise-sunset time as a function of latitude based on time of year. The cam 63 is adjusted by means of adjustment screws (not shown) which are located at every 30° on the surface. This adjustment, which is set in before launching of the vehicle, is made for time of the year and hemisphere. The motor shaft 62 is also in driving connection with shaft 64 which causes arm 59 to swing in the path of the arm 58. After the two arms have swung together for the twilight time interval, the motor 60 is stopped and the correspondence of its output with the time interval measured by the clock is assured. Cam follower shaft 65 serves to feed the latitude correction quantity to the differential 17 and to the differential 15 by means of driven shaft 66 as positive and negative increments of sunrise-sunset time so that the hands 4 and 5 are moved toward each other. The provision for setting of the hands accordingly is adapted to account for the fact that twilight and day and night periods differ with differences in latitude for the same longitude. In general, twilight is longer, sunrise is later and sunset is earlier in the more northern latitudes of the northern hemisphere and in the more southern latitudes of the southern hemisphere than in the regions near the equator at the same longitude.

Because the device is designed for the purpose of closing a contact when crossing a desired line of longitude, its operation is essentially independent of direction of flight. Therefore, corrections must be made in the location of the contacts 6 and 7, for changes in latitude. Accordingly, contact shaft 68 and connected shaft 69 are employed to feed latitude corrections from the shaft 65 to the contacts 7 and 6, respectively, and adjust their position for changes in Greenwich time of sunrise and sunset along the longitude of the intended destination for changes in latitude occurring during the flight from the launching site. Eventually, when the intended longitude is reached the contacts 6 and 7 will be electrically contacted by the hands 4 and 5, respectively, so as to close a triggering circuit in the mechanism which has been delivered for that purpose.

When the vehicle is to be released, hand No. 2 is set to Greenwich mean time and thereafter is maintained at proper Greenwich mean time by the operation of the clock motor. Hand No. 4 is set to the Greenwich mean time of sunrise at the launching site, while hand No. 5 is set to the Greenwich mean time of sunset at the launching site. The carriage of the integrator 8 is adjusted to move hands 4 and 5 at the average velocity anticipated from the launching time to the following sunrise or sunset.

Assuming a release during the day, the intermittent 30 is moved by an amount required to correct the estimated velocity to that velocity which might be expected during the first night of travel, and all storage is removed from the intermittent 29.

Contacts 6 and 7 are set for the sunrise and sunset times, respectively, at the intended destination of the vehicle, considering both latitude and longitude. The cam 63 (latitude-sunrise-sunset time) is adjusted for time of year and hemisphere.

After the vehicle is released, the hands 4 and 5 will move counterclockwise, assuming eastward travel, and if the estimated velocity is maintained, the hands 2 and 5 will be in contact at sunset.

In the event the predicted velocity has not been maintained and sunset occurs before the hand 2 meets the hand 5, the photocell 44 which senses dawn or sunset, actuates the relay circuit 39, causing the motor 38 and connected shafts 23 and 19 to drive the differentials 12, 15 and 17 and to drive the hands 4 and 5 until the hand 5 meets the clock hand 2. Simultaneously, the motor 38 stores the velocity required into the intermittent 29 through the shaft 23 and the differential 22. Accordingly, it is seen that the shaft 23 is employed to correct previous velocity estimates as well as to make possible the storing of those estimates in the intermittent devices 29 and 30. It is seen that predicted velocity correction is made by altering the carriage position of the integrator 8. This displacement of the carriage for velocity correction by the output of the motor 38 is proportional to the displacement of the hands 4 and 5 by the same output for longitude or local sunrise and sunset correction. The previously stored estimated velocity of the vehicle is then removed from storage in the intermittent 30 by the relay circuit 39, causing the motor 20 to adjust the carriage of the integrator. Thereafter hands 4 and 5 continue to move at this estimated velocity until dawn.

Assuming that the predicted night-time velocity was correct, the hand 4 will be in contact with the clock hand at sunrise and no motion of the motor 38 will be required. The information on daytime velocity previously stored in the intermittent 29 will actuate the motor 20 to adjust the position of the carriage of the integrator 8, and the motor will be fed through the differential 22 to remove the storage from the intermittent 29. Thereafter the hands 4 and 5 will continue to move at the predicted daytime velocity until the following sunset, at which time the whole cycle will be repeated.

Referring specifically to FIG. 3, the electromagnet 39a will be magnetized at sunrise by means of the photocell 44 and the potentiometer 45. Assuming the sunrise hand 4 is not in contact with the clock hand 2 the solenoid switch 76 remains closed and the servo motor 38 is operated. Due to the energizing of the electromagnet 39a, line 43 is energized by the battery and the clutch 28 is thereby made whereby the intermittent gear in the voltage device 30 is driven by the motor 38 for the purpose of correcting the estimated night time velocity stored therein. With the relay closed beginning at sunrise, energization is removed from the lead 34a and the solenoid switch 34 is in its upper position so that the motor 20 is driven according to the store estimated day time velocity in the voltage device 29. At the same time, the position of the sunrise hand 4 and the sunset hand 5 is corrected by the output of the motor 38 on the shaft 19. If, on the other hand, the sunrise hand 4 is in contact with the clock hand 2 at sunrise the solenoid switch 76 is opened by virtue of the fact that feedback line 49 is energized whereby operation of the motor 38 is prevented.

At sunset, the photocell 48 is shut down and the relay is opened so that lead 34a is energized by the battery and the solenoid switch 34 is positioned for removing the estimated night time velocity from the voltage device 30. Assuming the sunset hand 5 is not in contact with the clock hand 2 because the estimated day time velocity that had been stored in the voltage device 29 was in error, the solenoid switch 76 in the battery line for the motor 38 remains closed and the motor 38 is operated. Because the lead 42 is energized when the relay is opened at sunset, the clutch 27 is made and the output of the motor 38 is placed into the voltage device 29 to correct the estimated day time velocity stored therein at the same time the sunrise and sunset hands are corrected according to the output of the motor 38. If the sunset hand 5 and the clock hand 2 are in contact at sunset the solenoid switch 76 is opened and there will be no corrections made in the voltage device 29 or in the positioning of the sunrise and sunset hands.

The photocell 50 is set with a threshold level such that it senses the darker end of the twilight period and actuates the relay circuit 53. In order to determine the length of the twilight period, the relay circuit 53 also receives information from the photocell 44. As shown in FIG. 4 the relay circuit 53 includes an electromagnet 80 which has a coil energized by line 54 from the photocell 50 and the potentiometer 52. The output of the potentiometer 52 on line 54 is conveyed through solenoid switch 81 controlled by line 55 from the photocell 44. The relay circuit is provided with a battery which is connectable through electromagnet controlled switch 82 to the motor 57 by means of the lead 56. In morning twilight, the photocell 50 is actuated at the beginning or the darker end of the period. The photocell 44 which requires more light than the photocell 50 for actuation is off and therefore the solenoid switch 81 is in its normally closed position. The motor 57 is then started. At the end of the morning twilight period, which may be considered sunrise, there is sufficient light to actuate the photocell 44 and open the switch 81 and thereby stop the motor 57. At the beginning of evening twilight, the photocell 44 is again cut off at time of sunset whereby solenoid switch 81 is closed and with the photocell 50 still operating because of its lower threshold level the electromagnet 80 is reenergized to close the switch 82 and restart motor 57. At the end of the evening twilight period, light conditions are even less than that required to actuate the photocell 50 and the relay is opened to stop the motor 57. The operation of this motor sets in motion arm 58 which pivots contacts arm 59 causing its contact end to slide over contact 85 in the relay. This contact is in a circuit which includes the open terminal of the electromagnet controlled switch 82, the lead 61 and the motor 60. The latter's feedback shaft 64 is connected to the contact arm 59 so as to cause it to pivot in a direction opposite to that imparted by the arm 58. Thus it is seen that there will be an accurate correspondence between the output of the constant speed motor 57, which was generated while the switch 82 was closed, and the output of the motor 60 which is generated when the switch 82 is open. Also, the output on the shaft 62 will accurately reflect the period of time that the constant speed motor was operating throughout the twilight interval. The time interval as measured by the motor 57 is fed into the computing circuitry by the motor 60 which actuates latitude sunrise-sunset cam, thereby adjusting the contacts 6 and 7 and positioning hands 4 and 5 through differentials 15 and 17, respectively. This supplies a correction for latitude upon which the calculations are based.

Since the threshold level with which the photocells 44 and 50 are set is a function of altitude, corrections for level of flight are inserted through the potentiometers 45 and 52 by the altimeter 46.

Eventually, hands 4 and 5 will move far enough to make contact with points 6 and 7, respectively, at which point the vehicle should be at the predetermined target location and the mechanism will be triggered.

If desired, a relay circuit may be included in the photocell circuits to prevent the relays from chattering during the transition period from light to dark. Other changes in the system as shown may be made without departing from the scope of invention as defined in the appended claims.

I claim:

1. A position indicator comprising means for predicting the velocity of an airborne vehicle, a clock having sunrise and sunset local time indicators responsive to said velocity predicting means, a constant time hand mounted in said clock approximate said sunrise and sunset local time indicators and driven independently thereof, a light responsive circuit having a light responsive element and selective drive means connected to said velocity predicting means for making periodic velocity corrections in said velocity predicting means, said light responsive element being adapted to respond to predetermined light conditions prevailing at sunrise and sunset, an altimeter connected to said light responsive element for adjusting the light level response thereof in accordance with height of flight, means connecting said constant time hand to said light responsive circuit for preventing operation of the latter whenever the predicted velocity is correct and the light responsive circuit would otherwise be made operative, said clock being also provided with predicted sunrise and sunset time indicators at destination, means for changing the position of the indicators of said clock in accordance with change in latitude of said vehicle, said predicted sunrise and sunset time indicators at destination being adapted to contact said sunrise and sunset local time indicators whereby said predicted sunrise and sunset time indicators at destination may be employed on contacting the corresponding sunrise and sunset local time indicators to trigger a mechanism at a preselected longitudinal destination.

2. A position indicator comprising means for predicting the velocity of an airborne vehicle, a clock having sunrise and sunset local time indicators responsive to said velocity predicting means, a constant time hand mounted in said clock approximate said sunrise and sunset local time indicators and driven independently thereof, a light responsive circuit having a light responsive element and selective drive means connected to said velocity predicting means for making periodic velocity corrections in said velocity predicting means, said light responsive element being adapted to respond to predetermined light conditions prevailing at sunrise and sunset, means connecting said constant time hand to said light responsive circuit for preventing operation of the latter whenever the predicted velocity is correct and the light responsive circuit would otherwise be made operative, said clock being also provided with predicted sunrise and sunset time indicators at destination, a second light responsive circuit also connected to said light responsive element and having a second light responsive element adapted to respond to the predetermined light conditions prevailing at the darker end of a twilight period, said second light responsive circuit having means for measuring periods of twilight and means connecting said second light responsive circuit to said indicators for correcting the clock positions of said indicators for change in latitude, said predicted sunrise and sunset time indicators at destination being adapted to contact said sunrise and sunset local time indicators whereby said predicted sunrise and sunset time indicators at destination may be employed on contacting the corresponding sunrise and sunset local time indicators to trigger a mechanism at a predetermined longitudinal destination.

3. A position indicator as claimed is claim 2 wherein said second responsive circuit includes a relay circuit connected to both of said light responsive elements, a motor driven by said relay circuit, and a time interval clock energized by said relay circuit and selectively connected to said relay circuit and the output of said motor whereby the output of said motor and the period of twilight energization of said relay circuit will correspond and an altimeter is connected to said light responsive elements for adjusting the light level response of the elements according to height of flight.

4. A position indicator as claimed in claim 3, wherein said correcting means includes a cam in driven connection with said motor, said cam being adapted to generate latitude corrections as a function of twilight periods.

5. A position indicator as claimed in claim 4 wherein there is provided in said first-mentioned light responsive circuit a second relay circuit energized by said first mentioned light responsive element, a motor driven by said second relay circuit, a differential, a pair of solenoid clutches controlled by said second relay circuit and connected to receive the output of the differential and a pair of voltage devices, each of said voltage devices being connected to one of said solenoid clutches, a carriage setting motor selectively connected to said voltage storing elements, and an integrator having a carriage positioned by said carriage setting motor and a constant time, motor driven disc, the selective connection of said voltage devices and the carriage setting motor being controlled by the relay circuit in the first mentioned light responsive circuit and a feedback connection between said motor and said differential, the selective drive means includes a pair of solenoid clutches in energizing connection with said relay circuit and in mechanically driven connection with said motor, intermittent driving elements, each of said intermittent driving elements being connected to one of said solenoid clutches and a motor driven integrator selectively connected to said intermittent driving elements.

References Cited in the file of this patent

UNITED STATES PATENTS

| | | |
|---|---|---|
| 2,311,005 | Thurlow | Feb. 16, 1943 |
| 2,373,771 | Maxson | Apr. 17, 1945 |
| 2,408,356 | Willard | Sept. 24, 1946 |
| 2,416,223 | Sanders | Feb. 18, 1947 |
| 2,444,933 | Jasperson | July 13, 1948 |
| 2,762,123 | Schultz | Sept. 11, 1956 |
| 2,784,908 | Gray | Mar. 12, 1957 |